J. H. & E. W. BULLARD.
NUT LOCKING DEVICE.
APPLICATION FILED OCT. 6, 1909.
1,028,859.
Patented June 11, 1912.
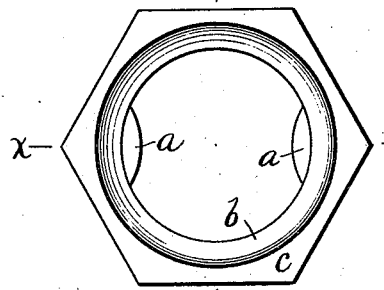
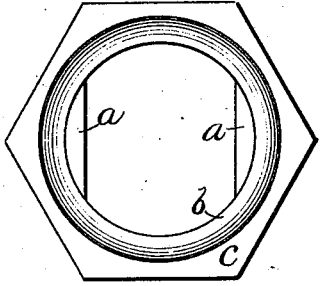
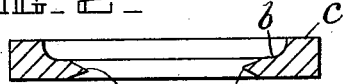
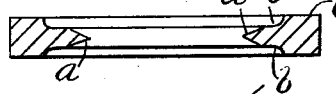
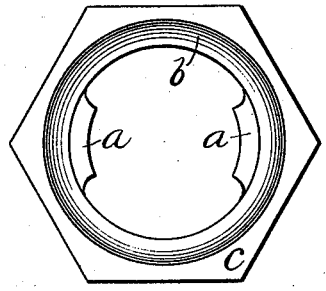
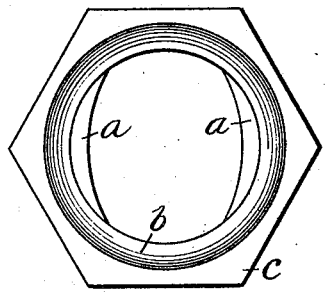
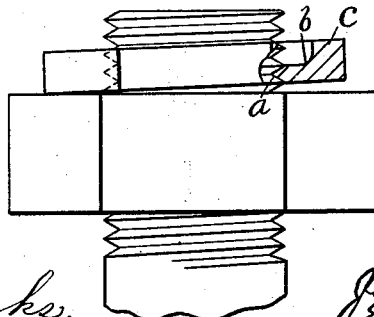
WITNESSES:
A. C. Fairbanks.
G. A. Angier.
INVENTOR.
James H. Bullard
Edwin W. Bullard
BY Allen Webster
ATTORNEY.

UNITED STATES PATENT OFFICE.

JAMES H. BULLARD AND EDWIN W. BULLARD, OF SPRINGFIELD, MASSACHUSETTS, ASSIGNORS, BY MESNE ASSIGNMENTS, TO UNITED NUT LOCK COMPANY, OF SPRINGFIELD, MASSACHUSETTS, A CORPORATION OF MASSACHUSETTS.

NUT-LOCKING DEVICE.

1,028,859.  Specification of Letters Patent.  Patented June 11, 1912.

Application filed October 6, 1909. Serial No. 521,198.

*To all whom it may concern:*

Be it known that we, JAMES H. BULLARD and EDWIN W. BULLARD, both citizens of the United States of America, and residents of Springfield, in the county of Hampden and State of Massachusetts, have jointly invented new and useful Improvements in Nut-Locking Devices, of which the following is a specification, reference being had to the accompanying drawings and letters of reference marked thereon.

Our invention relates to devices for securing or locking a nut in place on a bolt so as to prevent its accidental loosening or removal.

The objects of our invention are to provide a simple, light, strong, inexpensive device which will be efficient in operation and convenient in manipulation.

Our invention consists of a rigid plate of sufficient thickness to prevent deflection or distortion under the tension necessary to effectually lock the nut in place, having through it a bolt hole whose diameter in one direction is sufficient to pass clear over the threads of the bolt, but the diameter at right angles to this is restricted by inwardly projecting ridges or tongues, not helical or continuous, and separated by a space or gap between the ends of said tongues, said ridges or tongues being formed integral with the body of the lock, and being of such shape in cross section as shall best insure their proper engagement with the bolt threads. The length and outline of the said ridges or tongues in plan view may also be varied to secure the best engaging surface.

In the accompanying drawings, in which like letters of reference indicate like parts, we show more clearly the construction and modification of our device.

As illustrated, the body of our device is recessed on either one or both sides to the proper thickness for the thread-engaging tongues, which is preferably made approximately equal to the pitch of the bolt threads, leaving the periphery of the device of full thickness of the plate, thus insuring the necessary rigidity and also providing ample surface for the application of a wrench for adjustment.

Figure 1 is a plan view showing the body $c$, the recess $b$, and the inwardly projecting ridges or tongues $a$, these tongues being formed with a curved outline presenting their convex edges toward each other, the least distance between the tongues being approximately equal to the diameter of the bolt at the root of the thread. Fig. 2 is a cross section of the same taken on line $x$—$x$ showing the recess $b$ all in one side of the device. Fig. 3 is a like cross section showing a recess $b$ on both sides of the device. Fig. 4 is a section on line $v$—$v$ of Fig. 1 showing the recess $b$ all in one side as shown in Fig. 2. Fig. 5 is a plan view of the modification wherein the edges of the engaging tongues $a$ are straight instead of curved as shown in Fig. 1. Fig. 6 is a like plan view showing the engaging tongues $a$ having concave edges and with their end portions cut to present sharp, abrupt points. Fig. 7 is a plan view showing the engaging tongues $a$ having long concave inner edges, and Fig. 8 is an elevation showing a bolt, a nut mounted thereon and one of the locking devices in position on the bolt bearing against the outer face of the nut.

It will be noted that the tongues in all cases lie wholly within the thickness of the body of the locking device, thus contributing to the rigidity of the whole, and that the tongues are in all cases parallel to the flat sides of the lock. When the lock is applied to a bolt the opposite tongues engage with the bolt threads, the spiral of the bolt threads causes the lock to assume a position other than at right angles to the axis of the bolt and when the lock is screwed down to contact with the nut, one side or edge of the lock is in contact with the nut in advance of the opposite side or edge as shown, and further screwing down of the lock tends to square it with the axis of the bolt, thus setting up a very strong frictional contact with the bolt threads, without distorting either lock or bolt threads, and also causing the corners of the tongues to bear heavily on the sides of the bolt-threads and so producing a cramping and ratchet action which still further prevents the lock from backing off from the bolt and so holding the nut securely in place.

The device herein described is so simple in construction that its manufacture may readily be accomplished by stamping or punching from sheet steel of suitable thickness or by casting of malleable iron or steel as circumstances of use make most desirable. When making this device of a punching from sheet steel, the material is drawn into the form of a polygonal cup of the desired depth, the sides of the cup substantially at right angles to the plane of the body, thus furnishing the desired rigidity.

The gap or space between the ends of the thread-engaging members or tongues enables the nut lock to be placed in position on the bolt by straddling the bolt threads in such a manner that the end of the other tongue lies in the groove of the next convolution of the thread, thus causing one tongue to bear on one side or flank of a thread and the other tongue to bear on the other side or flank of the same thread. In this position, when the lock comes in contact with the surface of the nut as described, the tendency of the lock to assume a position at right angles to the axis of the bolt causes the ends of the thread-engaging members or tongues to bear very hard on the flanks of the bolt threads, creating a severe binding action similar to what is known to mechanics as a "silent ratchet," and so materially contributing to lock the nut securely in place.

We have found by experiment that the width of the gap is an important element in the efficiency of the lock and in practice we prefer to make this width approximately equal to one-half the diameter of the bolt at the root of the bolt thread.

What we claim as our invention, and desire to secure by Letters Patent, is—

1. In a nut locking device, a rigid body having a bolt opening, rigid inwardly projecting thread engaging members disposed in a plane parallel to the general plane of the device and separated from each other by a gap between their ends, the gap being of a depth to allow the bolt threads to pass.

2. In a nut locking device, a body having a bolt opening, and having a concentric recess, as $b$, inwardly projecting thread engaging members disposed in a plane parallel to the general plane of the device and separated from each other by a gap between their ends.

3. In a nut locking device a body having a bolt opening through it and having a concentric recess as $b$ on both sides, rigid inwardly projecting thread engaging members disposed in a plane parallel to the general plane of the device and separated from each other by a gap between their ends.

4. In a nut lock, a rigid body having a bolt opening through it, rigid inwardly projecting thread engaging members disposed in a plane parallel to the general plane of the device and shaped to conform to the shape of the bolt thread recess, and separated from each other by a gap between their ends.

5. In a nut locking device, a rigid body having a bolt receiving opening through it, and rigid inwardly projecting thread engaging members having curved inner edges, and disposed in a plane parallel to the general plane of the device and separated from each other by a gap between their ends.

6. A nut locking device comprising a rigid body having a bolt opening through it, the circumferential portion of the body being of greater thickness than the pitch of the bolt threads, the inner portion of the body being of less thickness than the outer portion, and rigid thread engaging members projecting into the bolt opening, and separated from each other by a gap between their ends, said thread engaging members being so disposed as to cause the face of the device adjacent the nut to occupy a position on the bolt other than at right angles to the bolt axis.

7. A nut locking device comprising a rigid body having a bolt opening through it, and having rigid inwardly projecting thread engaging members separated from each other by a gap between their ends, the gap being of a depth to clear the bolt threads.

8. A nut lock comprising a rigid body having a bolt receiving opening through it and having rigid inwardly projecting thread engaging members separated from each other by a gap between their ends, said members being shaped in cross section to substantially fill the thread opening in the bolt and so disposed as to cause the face of the device adjacent the nut to occupy a position on the bolt other than at right angles to the axis of the bolt.

JAMES H. BULLARD.
EDWIN W. BULLARD.

Witnesses:
A. C. FAIRBANKS,
J. M. DAVENPORT.